Sept. 11, 1923.

F. L. MINNICK

VEHICLE WHEEL

Filed Sept. 28, 1921

Inventor

F. L. Minnick.

By Lacy & Lacy, Attorneys

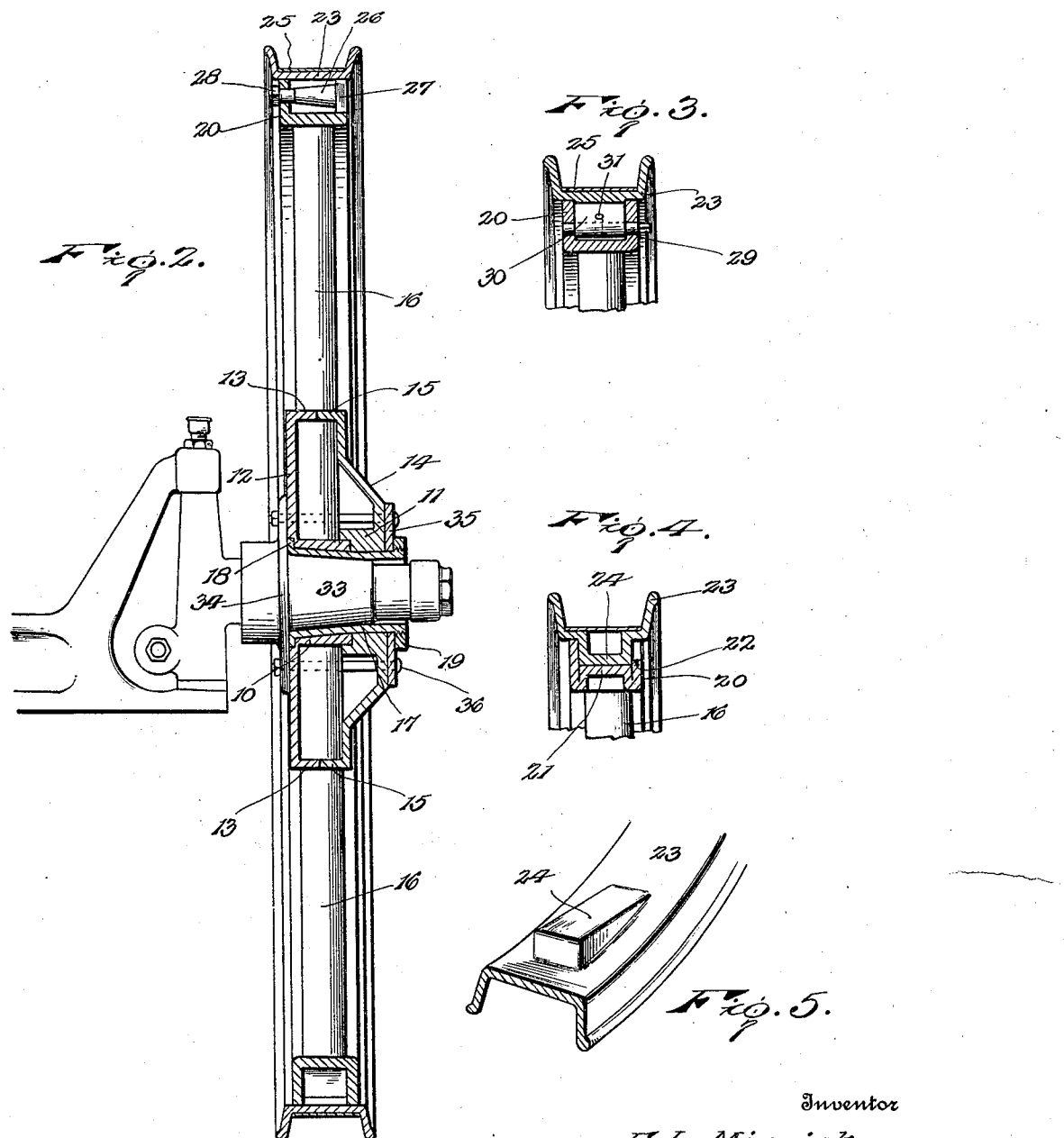

Sept. 11, 1923.
F. L. MINNICK
VEHICLE WHEEL
Filed Sept. 28, 1921
1,467,446
3 Sheets-Sheet 3
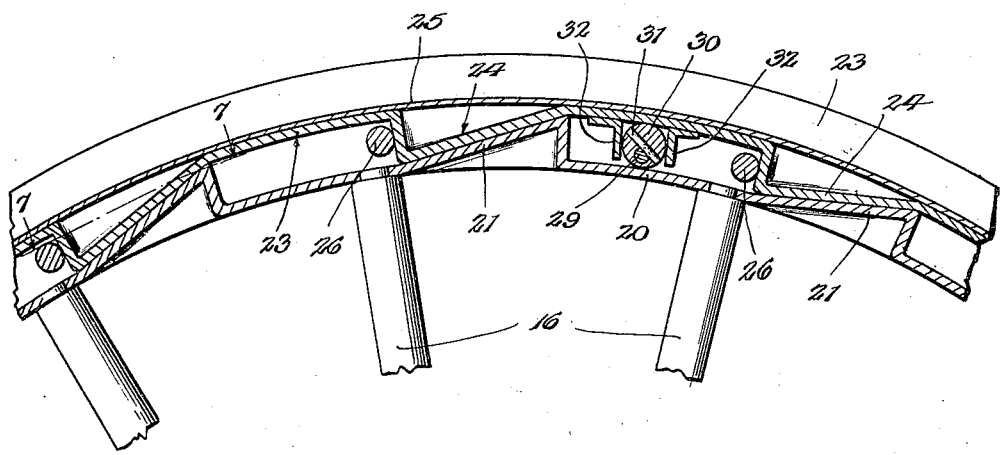
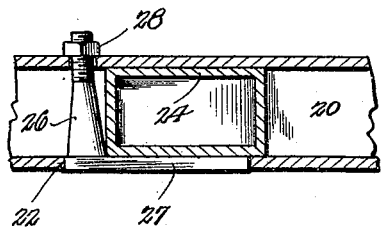
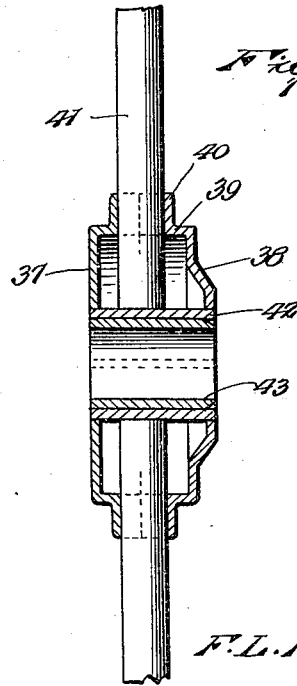
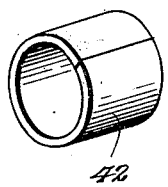
Inventor
F. L. Minnick.
By Lacey & Lacey, Attorneys Patented Sept. 11, 1923.

1,467,446

UNITED STATES PATENT OFFICE.

FREDERICK L. MINNICK, OF SPOKANE, WASHINGTON, ASSIGNOR TO TUBULAR STEEL AUTOMOBILE WHEEL MANUFACTURING COMPANY, OF SPOKANE, WASHINGTON, A CORPORATION OF WASHINGTON.

VEHICLE WHEEL.

Application filed September 28, 1921. Serial No. 503,753.

*To all whom it may concern:*

Be it known that I, FREDERICK L. MINNICK, a citizen of the United States, residing at Spokane, in the county of Spokane and State of Washington, have invented certain new and useful Improvements in Vehicle Wheels, of which the following is a specification.

This invention relates to an improved wheel for motor vehicles and has as one of its principal objects to provide a wheel the parts of which may be pressed from sheet metal.

A further object of the invention is to provide a wheel embodying a demountable rim and wherein novel means will be provided for locking the rim upon the wheel.

And the invention has as a still further object to provide a wheel which will be of rigid and durable construction and which will be adapted for general use upon motor vehicles.

Other and incidental objects will appear hereinafter.

In the drawings:

Figure 2 is a sectional view on the line 2—2 of Figure 1, looking in the direction of the arrows.

Figure 1:
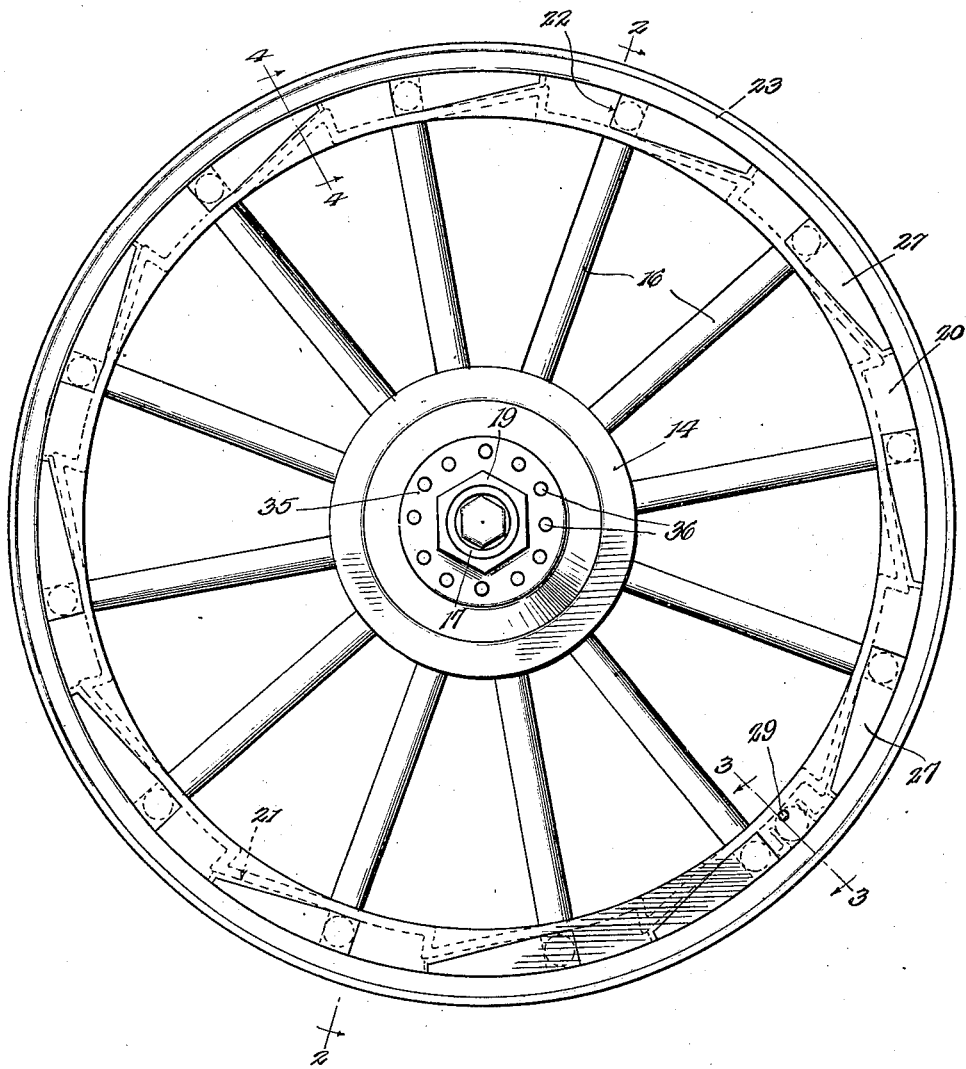
Figure 1 is an elevation of my improved wheel.
Figure 8:
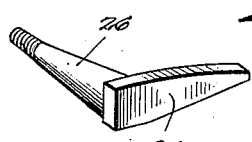

Figure 3 is a detail sectional view on the line 3—3 of Figure 1, looking in the direction of the arrows, Figure 4 is a sectional view on the line 4—4 of Figure 1, looking in the direction of the arrows, Figure 5 is a detail perspective particularly showing one of the wedge blocks carried by the wheel rim, Figure 6 is a fragmentary circumferential section through the felly and rim of the wheel, Figure 7 is a detail section on the line 7—7 of Figure 6, Figure 8, is a detail perspective view showing one of the locking pins employed for the rim, Figure 9 is a fragmentary section showing a slightly modified form of hub, and Figure 10 is a detail perspective view showing the split hub ring employed in the modified construction.

In carrying the invention into effect, I employ a hub which is formed of mating sections 10 and 11 respectively, the section 10 seating at its inner end in the inner end of the section 11. Extending from the section 10 is a flat radial hub plate 12 provided at its periphery with an inwardly directed annular flange 13. The section 11 is also provided with a radial hub plate 14 which is offset inwardly toward the plate 12 and is provided at its periphery with an annular flange 15 mating with the flange 13 of the plate 12, these flanges abutting at their free edges. Formed in said flanges are mating notches which define openings through which are fitted tubular spokes 16 resting at their inner ends against the hub section 10 confined between the plate 12 and the inner end of the hub section 11 and extending through both of the hub sections is a tapered boxing 17. This boxing is provided at one end with a flange 18 countersunk in the outer end of the hub section 10 and threaded upon the boxing at its opposite end is a nut 19 coacting with the hub section 11. As will be perceived, this nut may be adjusted for rigidly securing the hub sections together and tightly binding the spokes 16 between the flanges 13 and 15 of the hub plates of said sections.

Secured to the spokes 16 at their outer ends is a channel shaped felly 20 from the bottom wall of which is pressed, as particularly shown in Figure 6, a series of circumferentially spaced inclined seats 21 at each of which the outer side wall of the felly is formed with a tapered notch 22. Removably surrounding the felly is a rim 23 which may be either of the straight side type or clincher type for accommodating a tire. Pressed from the bottom wall of the rim is, as also particularly shown in Figure 6, a series of wedge members 24 which are formed to coact with the seats 21 of the felly and lying within the rim is a preferably metallic liner 25 covering the wedge members so as to present a smooth surface to the tire. The wedge members are, of course, adapted to pass freely through the notches 22 when brought into register therewith so that the rim may be readily assembled upon the felly and arranged behind each of said wedge members is a locking pin 26. As particularly shown in Figures 7 and 8, these locking pins are tapered longitudinally and are provided at their outer ends with substantially triangular shaped heads 27 fitting in the notches 22 while the inner ends of said pins are freely received through suitable openings in the inner side wall of the felly. Threaded upon said pins are nuts 28. Thus, after the rim has been initially arranged in position to surround the felly, the locking pins 26 are mounted in place when, by tightening the nuts 28 of said pins, the pins will be moved endwise to coact with the larger ends of the wedge members for rotating the rim upon the felly and consequently shifting the wedge members into binding engagement with the inclined seats 21. At the same time, the heads 27 of said pins will be shifted to seat against the outer side faces of the wedge members so that said members will be clamped between said heads and the inner side wall of the felly. Consequently, as will be seen, the rim will be securely and rigidly locked upon the felly. Journaled through the side walls of the felly at any suitable point therealong is a cross shaft 29 and mounted on said shaft is a cam 30 freely received between said side walls. The shaft removably fits through the cam so that the parts may be assembled upon the felly and driven through the cam to coact with the shaft is a locking pin 31 securing the cam upon the shaft. Appropriately secured to the bottom wall of the rim, at its inner side, are spaced angle plates 32 disposed to receive the cam therebetween and, as will now be observed upon reference to Figure 1, the shaft is squared at its outer end so that said shaft may be turned for rotating the cam. When the cam is rotated in a clockwise direction, said cam will coact with one of the angle plates for shifting the rim in a direction circumferentially of the felly and thus causing the wedge members 24 to bind against the seats 21 while when the cam is rotated in an opposite direction, said cam will coact with the other of the angle plates for shifting the wedge members away from said seats. As will be seen, the cam provides a means additional to the locking pin 26 for wedging the rim upon the felly.

The wheel of the present invention is particularly designed to be used interchangeably with the ordinary wheels of a motor vehicle and in Figure 2 of the drawings, I have shown my improved wheel in connection with an ordinary wheel hub 33 which is provided near its inner end with the usual hub plate 34. As will be observed, the boxing 17 is formed to fit over the hub 33. Consequently, after the original wheel has been removed from the hub, my improved wheel may be readily fitted over the hub to abut the hub plate 34. An outer hub plate 35 is provided, this hub plate being secured against the outer end of the hub by the nut 19, and extending through said plate, through the hub plates 12 and 14, as well as through the hub plate 34, are bolts 36 rigidly connecting the wheel with the hub 33. Thus, my improved wheel may be readily substituted for an ordinary wheel.

In Figures 9 and 10 of the drawings, I have illustrated a slightly modified form of hub. In this modification, I employ mating hub plates 37 and 38 respectively, which are provided with peripheral abutting flanges 39 on which are formed bosses 40, these bosses being designed to accommodate spokes 41, and extending through the hub plates axially thereof is a split hub tube 42 against which the spokes rest at their inner ends. Driven through this tube is a boxing 43 which serves to expand the tube for shifting the spokes radially so that the spokes will tightly coact with a wheel felly while the tube is coincidently caused to tightly coact at its ends with the hub plates 37 and 38 for connecting the plates to clamp the spokes therebetween.

Having thus described the invention, what is claimed as new is:

1. In a vehicle wheel, a felly inclined seats, a rim surrounding the felly and provided with wedge members coacting with said seats, one side wall of the felly being formed with notches to accommodate said members whereby the rim may be removed laterally from around the felly, and tapered locking pins carried by the felly to coact with said members for riding the members into binding engagement with the seats, said pins being provided with heads fitting in said notches to coact with the members for securing the rim against lateral movement.

2. A vehicle wheel including a felly having side walls and provided with inclined seats, a rim surrounding the felly and provided with wedge members to coact with said seats, a plate carried by the rim and a cam journaled upon said side walls of the felly to coact with said plate for rotating the rim and shifting said members into binding engagement with said seats.

3. In a vehicle wheel, a channel shaped felly having a series of inclined seats pressed from the bottom wall thereof, and a rim surrounding the felly and having a series of wedge members pressed from the bottom wall thereof and fitting between the side walls of the felly to coact with said seats braced against lateral movement in opposite directions by the side walls of the felly.

4. In a vehicle wheel, a channel shaped felly having annular side walls and a bottom wall, the bottom wall thereof provided with inclined seats, a rim surrounding the felly and provided with wedge members coating with said seats, one side wall of the felly being provided at spaced points with notches to receive said members therethrough, and means lying in the notches limiting the wedge members against lateral displacement.

5. In a vehicle wheel, a channel shaped felly having annular side walls and a bottom wall the bottom wall thereof provided with inclined seats, a rim surrounding the felly and provided with wedge members coacting with said seats, one side wall of the felly being provided at spaced points with notches to receive said members therethrough, and means lying in said notches to coact with said wedge members and adjustable upon the felly for shifting the rim laterally and binding the wedge members against the opposite side wall of the felly.

6. In a vehicle wheel, a channel shaped felly having the bottom wall thereof provided with inclined seats, a rim surrounding the felly and provided with wedge members coacting with said seats, one side wall of the felly being notched to receive said members therethrough, and pins engaged with the opposite side wall of the felly and provided with heads lying in said notches to coact with said wedge members.

In testimony whereof I affix my signature.

FREDERICK L. MINNICK. [L. S.]